April 28, 1959 R. E. J. NORDQUIST 2,883,956
CAN BODYMAKER
Filed June 28, 1956 2 Sheets-Sheet 1
Fig. 1
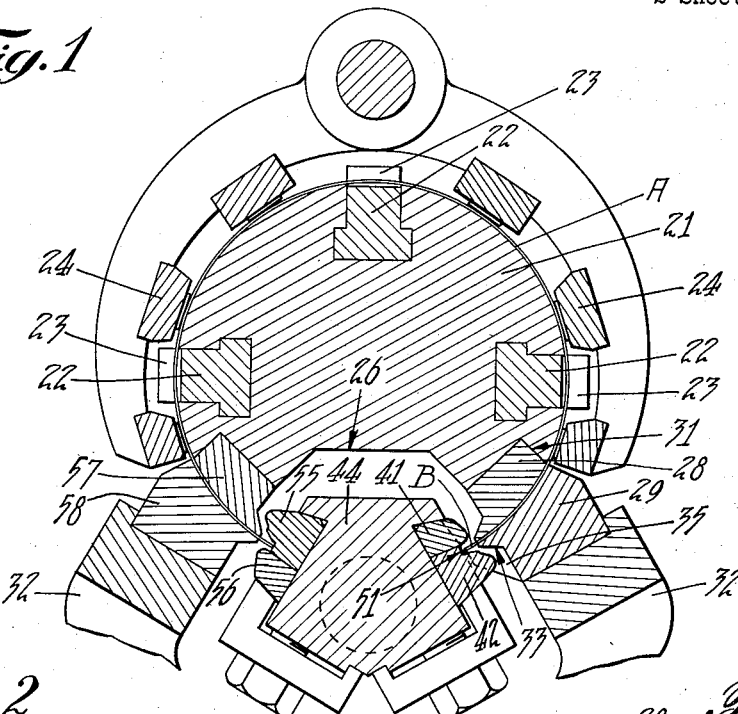
Fig. 2
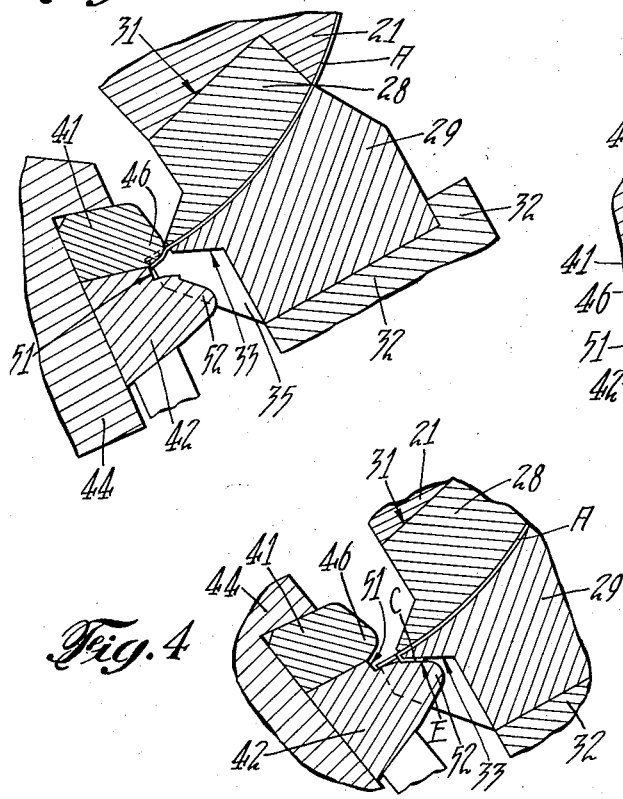
Fig. 3
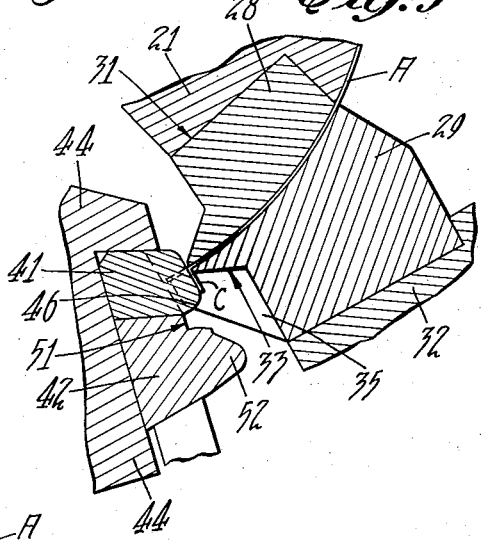
Fig. 4
INVENTOR.
RONALD E. J. NORDQUIST
BY Charles H. Erne
Leland R. McCann
George W. Reiber
ATTORNEYS

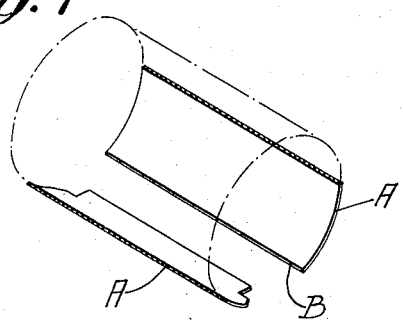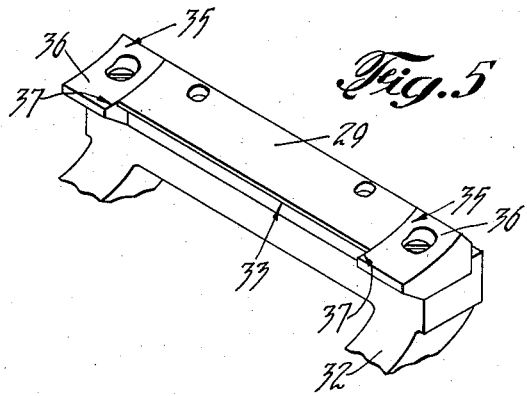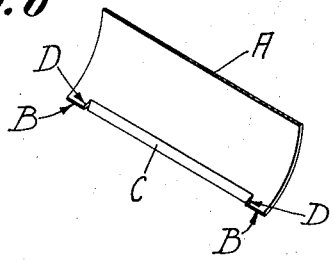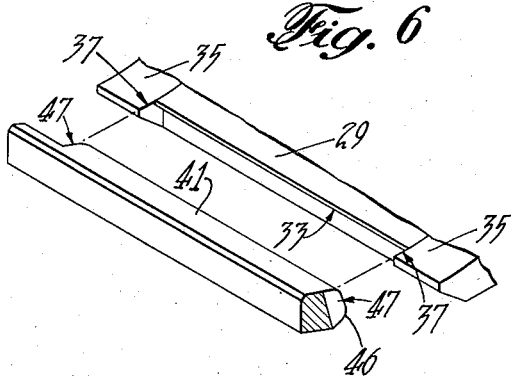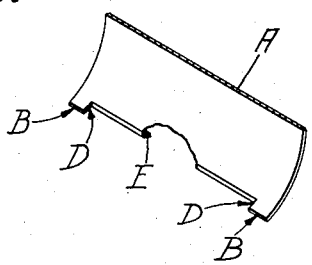

United States Patent Office 2,883,956
Patented Apr. 28, 1959

2,883,956

CAN BODYMAKER

Ronald E. J. Nordquist, Summit, N.J., assignor to American Can Company, New York, N.Y., a corporation of New Jersey Application June 28, 1956, Serial No. 594,441

4 Claims. (Cl. 113—8)

The present invention relates to machines for making can bodies and the like articles having side seams of the lock and lap type and has particular reference to devices for shearing and forming the locking hooks on the body in a single operation at a single station.

An object of the invention is to simplify the construction and operation of a can body making machine by the provision of a single station where the side seam marginal edge portions of partially formed can bodies moving along a horn may be both sheared and edged in a single operation so as to expedite the travel of bodies through the machine and to eliminate separate slitting or shearing and edging stations or operations as now conventionally practiced in can body making machines.

Numerous other objects and advantages of the invention will be apparent as it is better understood from the following description, which, taken in connection with the accompanying drawings, discloses a preferred embodiment thereof.

Referring to the drawings:

Figure 1 is a transverse sectional view of a can body making machine body support horn with associated parts embodying the instant invention, parts being broken away;

Figs. 2, 3, and 4 are enlarged fragmentary sectional views of the shearing and edging tools shown in Fig. 1, the views showing different positions of the tools at different stages in the process of shearing and edging a side seam marginal edge portion of a can body;

Fig. 5 is a perspective view of one of the tools shown in Fig. 1, with parts broken away;

Fig. 6 is a view similar to Fig. 5, the view showing the tool in its working relation to an opposing cooperating tool; parts being broken away; and Figs. 7, 8 and 9 are fragmentary perspective views of the side seam marginal edge portions of a can body, the views showing different stages in the shearing and edging of an edge portion of the body.

As a preferred or exemplary embodiment of the instant invention the drawings illustrate principal parts of the can body edging station of a conventional can body making machine as that disclosed in United States Patent 1,770,041 issued July 8, 1930, to John F. Peters on Roll Bodymaker. In such a machine, rectangular sheet metal blanks, made of tin plate or the like material are fed through a series of working stations where the blank is first notched or slit along its side seam edges to define the hook portions, is then bent around a supporting horn into a tubular form with its slit edges spaced apart, and is then advanced along the horn into an edging station where the hook portions are bent into reversely directed hooks, and then into a bumping station where the hooks are interengaged and squeezed together tightly to interlock them permanently.

In the instant invention, the separate slitting station is wholly or partially eliminated and the shearing and edging are effected simultaneously at the edging station. For this purpose Fig. 1 of the drawings illustrates a partially formed can body A having a side seam marginal edge portion B (see also Fig. 7), supported on a horn or mandrel 21 of a conventional can body making machine. The horn 21 is provided with the usual feed bars 22, feed dogs 23, and hold down elements 24 as shown in the above mentioned Peters' Patent 1,770,041.

The bottom of the horn 21 is provided with a recess 26 into which the marginal edge portion B of the body A projects for the shearing and edging operation. The body A adjacent the projecting edge portion B is tightly clamped against movement by a pair of cooperating clamp bars 28, 29 disposed on opposite sides of the body. The clamp bar 28 is a stationary element and is seated in a recess 31 formed in the bottom of the horn 21 adjacent the recess 26. The clamp bar 29 is movable toward and away from the clamp bar 28 to permit advancement of the can body into and out of the edging station. This clamp bar 29 is carried on a rocker arm 32 which is pivotally mounted in the machine and rocked at the proper time as disclosed in the Peters' patent hereinbefore mentioned. The inner edge of the clamp bar 29 is undercut to form a tapered hook forming face 33 for use in shaping the side seam hook as will be hereinafter fully explained.

The clamp bar 29 extends along the horn 21 for the full length of the hook portion of the can body and its inner edge is disposed in spaced relation to the inner edge of the can body a distance substantially equal to the width of the hook to be formed as best shown in Fig. 1. Adjacent each end of the clamp bar 29, the rocker arm 32 carries a shearing die element or block 35 (see also Figs. 5 and 6) having a supporting face 36 which is flush with the clamping face of the clamp block 29 and which extends inwardly under substantially the full width of the marginal edge portion B of the body to fully support this edge portion beyond the hook section for the notching operation. Immediately adjacent the ends of the clamp bar 29 the shearing blocks 35 preferably are formed with a cutting or shearing edge 37 (Fig. 5).

The shearing and edging of the body edge portion B is effected by a pair of edging tools 41, 42 which are disposed in the horn recess 26 in parallelism with the horn and adjacent the marginal edge portion B of the body projecting into the recess. These edging tools 41, 42 extend the full length of the can body held by the clamp bars 28, 29 and are carried in an oscillatable edger head 44 disposed in the horn recess 26 and oscillated at the proper time as disclosed in the above mentioned Peters' patent. The edger tools 41, 42 are located one above the other for alternate engagement against the marginal edge portion B of the can body.

The upper edger tool 41, for a length substantially equal to the length of the clamp block 29, is formed with a rounded nose 46 which projects beyond the edger head 44 a distance sufficient to effect a wiping action against the inner edge of the clamp bar 29 when the edger head 44 is rocked in a clockwise direction as viewed in Fig. 1. The ends of this nose portion of the upper edger tool 41 are formed as die element cut edges 47 (Fig. 6) for cooperation with the cut edges 37 of the shearing blocks 35.

The lower edger tool 42 for substantially the full length of the cam body is formed with a longitudinal gauging groove 51 disposed directly under the upper edger tool 41. Adjacent this groove the lower tool 42 is formed with a shaped nose 52 for engagement against the tapered face 33 of the clamp bar 29 when the edger head 44 is rocked in a counterclockwise direction as viewed in Fig. 1.

When a cam body A advances along the horn 21 into the edger station as viewed in Fig. 1, the edger head 44 is in the position shown in Fig. 1, and the side seam marginal edge portion B of the body rides into and along the gauging groove 51 in the head to locate or gauge the edge portion B to insure the proper amount of overhang relative to the clamp bar 28. The clamp bar 29 having been in a retracted position during entrance of the body into the edger station, now moves up into position against the horn to clamp the body and to support the overhanging edge portion B adjacent its ends.

With the body A in this clamped and supported position on the horn, the edger head 44 rocks in a clockwise direction as viewed in Fig. 1 and this movement causes the rounded nose 46 of the upper edging tool 41 to press down against the overhanging edge portion B of the body and simultaneously causes the cut edges 47 (Fig. 6) at the ends of the upper edger tool 41, in cooperation with the cut edges 37 on the shearing blocks 35, to cut through or slit the edge portion B for the full width of the hook to be formed, as shown in Figs. 2 and 8.

As this slitting or shearing and bending operation on the edge portion B continues, a hook portion C (Fig. 8) defined by a pair of slits D is formed or wiped into position over the inner edge of the lower clamp bar 29 as shown in Fig. 3. The clockwise rotation of the gripper head 44 is then terminated and the direction of rotation reversed. During this reverse rotation, the shaped nose 52 of the lower edger tool 42, engages the partially formed hook portion C and bends it upwardly against the tapered face 33 of the clamp bar 29 as shown in Fig. 4 to produce a fully bent hook E (Fig. 9). The edger head 44 then returns to its neutral position as shown in Fig. 1 and the clamp bar 29 is moved away from the horn to release the body so that it may be advanced to the next station along the horn and to permit advancement of another body into the edger station.

In this manner the marginal edge portion of the can body is operated upon to simultaneously shear and edge the body in a single operation at a single station and thereby expedite the travel of the body through the machine and eliminate other slitting or notching devices at other parts of the machine.

The drawings show this simultaneous shearing and edging operation as performed on only one marginal edge portion B of the can body and the opposite edge portion as being merely edged in the conventional manner. For this purpose the edger head 44 carries a pair of conventional upper and lower edging tools 55, 56 (Fig. 1) which cooperate with conventional stationary and movable clamp bars 57, 58 as shown in the above mentioned Peters' patent. However it should be understood that both side seam edge portions of the body may be sheared and edged at the same time, if desired, by replacing the conventional edging tools 55, 56 and clamp bars 57, 58 with edging tools and clamp bars similar to the tools 41, 42 and clamp bars 28, 29.

It is thought that the invention and many of its attendant advantages will be udnerstood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies, the combination of a hook forming station, a horn for supporting a partially formed can body at said station, and a combined shearing and edging means located adjacent said horn at said station, said means being oscillatable about a fixed axis disposed substantially parallel to the axis of said horn and in spaced relation thereto for simultaneously shearing and bending a side seam hook on a marginal edge portion of said body while on said horn at said station.

2. A machine of the character defined in claim 1 wherein said edging means comprises an oscillatory member carrying edging tools for bending said body edge portion into a side seam hook, and wherein said shearing means comprises a die element carried on and movable with said oscillatory member and a cooperating die element disposed in a relatively stationary position adjacent said oscillatory member for the reception of said body edge portion between said die elements.

3. A machine of the character defined in claim 2 wherein cooperating clamp bars are disposed on the interior and exterior of the can body supported on said horn for the reception and clamping of said body therebetween adjacent its marginal edge portion, and wherein said cooperating die element is disposed in one of said clamp bars for supporting said body edge portion during the shearing operation.

4. A machine of the character defined in claim 3 wherein one of said clamp bars is formed with an edge portion beyond which the marginal edge portion of said body projects and over which said projecting body portion is bent into hook formation, said clamp bar at each end of said edge portion having a die block projecting beyond said clamp bar edge portion for supporting and shearing a portion of said projecting body edge portion, and wherein one of said edging tools is provided with a projecting nose for cooperation with said clamp bar edge portion to effect the bending of said unsupported projecting portion of said body edge portion into hook formation, said edging tool having at each end thereof a die element for cooperation with the die blocks on said clamp bar to effect said shearing operation.

References Cited in the file of this patent

UNITED STATES PATENTS

| 1,806,986 | Rucker | May 26, 1931 |
| 1,875,353 | Peters | Sept. 6, 1932 |
| 2,160,327 | Dunn | May 30, 1939 |
| 2,429,982 | Begg | Nov. 4, 1947 |
| 2,728,316 | O'Berg et al. | Dec. 27, 1955 |